(12) United States Patent
Minamino et al.

(10) Patent No.: US 11,346,607 B2
(45) Date of Patent: May 31, 2022

(54) TEMPERATURE MEASURING INSTRUMENT FOR HIGH TEMPERATURE AND PRESSURE FURNACE

(71) Applicant: KOBE STEEL, LTD., Hyogo (JP)

(72) Inventors: Tomoya Minamino, Takasago (JP); Katsumi Watanabe, Takasago (JP); Yasuo Manabe, Osaka (JP); Kazuya Suzuki, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 391 days.

(21) Appl. No.: 16/488,544

(22) PCT Filed: Mar. 2, 2018

(86) PCT No.: PCT/JP2018/007944
§ 371 (c)(1),
(2) Date: Aug. 23, 2019

(87) PCT Pub. No.: WO2018/163981
PCT Pub. Date: Sep. 13, 2018

(65) Prior Publication Data
US 2020/0003495 A1    Jan. 2, 2020

(30) Foreign Application Priority Data

Mar. 8, 2017   (JP) .............................. JP2017-043607

(51) Int. Cl.
*G01K 7/00*      (2006.01)
*G01K 1/00*      (2006.01)
*F27D 21/00*    (2006.01)
*F27B 17/00*    (2006.01)
(Continued)

(52) U.S. Cl.
CPC .......... *F27D 21/0014* (2013.01); *F27B 17/00* (2013.01); *G01K 1/08* (2013.01); *G01K 7/02* (2013.01)

(58) Field of Classification Search
USPC ........................................ 374/179, 208, 141
See application file for complete search history.

(56) References Cited

U.S. PATENT DOCUMENTS

| 5,092,938 A | 3/1992 | Kanda et al. |
| 5,696,348 A * | 12/1997 | Kawamura ............ G01K 1/125 |
| | | 136/201 |
| 2004/0161014 A1* | 8/2004 | Kofune .................... G01K 7/02 |
| | | 374/179 |

FOREIGN PATENT DOCUMENTS

| CN | 2060118 U | 8/1990 | |
| JP | 58151532 A * | 9/1983 | ............... G01K 7/04 |
| JP | S60-218583 A | 11/1985 | |

* cited by examiner

*Primary Examiner* — Mirellys Jagan
(74) *Attorney, Agent, or Firm* — Studebaker & Brackett PC

(57) ABSTRACT

Provided is a temperature measuring instrument 7 for a high temperature and pressure furnace having a structure capable of preventing relative displacement of an insulating tube 10 with respect to a pair of metal bodies 8a and 8b. A distal end engaging portion 22 is provided in an axial direction end portion of the insulating tube 10. The temperature measuring instrument 7 is additionally provided with connecting members 15 and 17 which connect distal end portions of the pair of metal bodies 8a and 8b to one another. The insulating tube 10 is locked to the connecting members 15 and 17 at the distal end engaging portion 22 in such a way as to restrict relative displacement in the circumferential direction with respect to the pair of metal bodies 8a and 8b.

6 Claims, 7 Drawing Sheets

(51) Int. Cl.
*G01K 1/08* (2021.01)
*G01K 7/02* (2021.01)

TEMPERATURE MEASURING INSTRUMENT FOR HIGH TEMPERATURE AND PRESSURE FURNACE

TECHNICAL FIELD

The present invention relates to a temperature measuring instrument for a high temperature and pressure furnace such as a pressure sintering furnace, a hot isostatic pressing device, or the like.

BACKGROUND ART

Hot isostatic pressing (hereinafter, abbreviated as HIP) treatment means to treat a workpiece by simultaneously applying a high temperature of several hundreds to 2000° C. and an isotropic high pressure of several tens to several hundreds MPa thereto in a pressure medium gas atmosphere. Currently, HIP treatment of a ceramic material or a phosphor material at a high temperature of 2000° C. or higher is increasing.

As a temperature measuring instrument applied to a high temperature and pressure furnace such as a HIP device, there is a thermocouple thermometer described in Patent Document 1, for example. The thermocouple thermometer described in Patent Document 1 includes a thermocouple rod member having an outer diameter of 3 mm or more, and an insulating tube having a thermocouple rod member insertion hole having an inner diameter larger than the outer diameter of the thermocouple rod member. Patent Document 1 describes that in order to secure a gap between the thermocouple rod member and the thermocouple rod member insertion hole, the inner diameter of the thermocouple rod member insertion hole is set to, for example, 4 mm with respect to the thermocouple rod member having the outer diameter of 3 mm.

Then, if the thermocouple thermometer is used, for example, under a high temperature such as 2000° C., thermoelectromotive force of the thermocouple thermometer may be lowered by a chemical reaction between a material component of a thermocouple wire and a material component of the insulating tube. As a result, the usable frequency of the thermocouple thermometer is reduced. That is, the life of the thermocouple thermometer is shortened.

In the above thermocouple thermometer, by using the thermocouple rod member having a large outer diameter of 3 mm or more as a metal wire constituting a thermocouple, the life of the thermocouple wire is lengthened than the case where a commercial thermocouple wire whose wire diameter is around 0.5 mm is used. Moreover, in the above thermocouple thermometer, for example, by setting the inner diameter of the thermocouple rod member insertion hole to 4 mm with respect to the thermocouple rod member having an outer diameter of 3 mm, the gap between the thermocouple rod member and the thermocouple rod member insertion hole is secured. Thanks to the gap, a contact between the thermocouple wire and the insulating tube is prevented, and a chemical reaction therebetween is suppressed.

However, the thermocouple thermometer described in Patent Document 1 has the following problems that need to be solved. That is, the whole of the insulating tube described in Patent Document 1 is not particularly restrained in a circumferential direction thereof, and therefore there is a fear that the whole of the insulating tube is deviated in the circumferential direction from a normal position and the thermocouple rod member contacts an inner wall surface of the insulating tube surrounding the thermocouple rod member insertion hole. The normal position is a position where the center of the thermocouple rod member insertion hole and the center of the thermocouple rod member coincide. Moreover, in the assembled thermocouple thermometer, there is also a fear that the whole insulating tube is relatively rotated with respect to the thermocouple rod member, that is, is relatively displaced in the circumferential direction, and thereby the thermocouple rod member contacts the inner wall surface of the insulating tube surrounding the thermocouple rod member insertion hole. The contact promotes the chemical reaction between the material component of the thermocouple rod member and the material component of the insulating tube.

CITATION LIST

Patent Document

Patent Document 1: JP S60-218583 A

SUMMARY OF THE INVENTION

An object of the present invention is to provide a temperature measuring instrument for a high temperature and pressure furnace having a structure capable of preventing relative displacement in a circumferential direction of an insulating tube with respect to at least a pair of metal bodies.

Provided is a temperature measuring instrument for a high temperature and pressure furnace, and the temperature measuring instrument includes at least one pair of metal bodies each of which is wire-shaped or bar-shaped and has a different material from each other, an insulating tube having a plurality of insertion holes having an inner diameter larger than an outer diameter of each of the at least one pair of metal bodies and permitting insertion of the metal bodies, and at least one connecting member fixed to respective distal end portions each of which is one end portion of both end portions in a longitudinal direction of the at least one pair of metal bodies to connect the distal end portions to one another. At the end portion on a distal end side near the distal end portion of both end portions in an axial direction of the insulating tube, a distal end engaging portion including at least one of a concave portion and a convex portion is provided, the distal end engaging portion is engaged with the connecting member, and thereby, the insulating tube is locked to the connecting member at the distal end engaging portion so as to restrict relative displacement in a circumferential direction of the insulating tube with respect to the metal bodies fixed to the connecting member.

DESCRIPTION OF EMBODIMENTS

Hereinafter, embodiments of the present invention will be described with reference to the drawings. In the following description, the case where a temperature measuring instrument 7 according to an embodiment of the present invention is applied to a HIP device 100 shown in FIG. 1 will be illustrated.

It should be noted that the temperature measuring instrument of the present invention can be applied not only to a HIP device, but also to various high temperature and pressure furnaces such as a pressure sintering furnace and the like.

Figure 1:
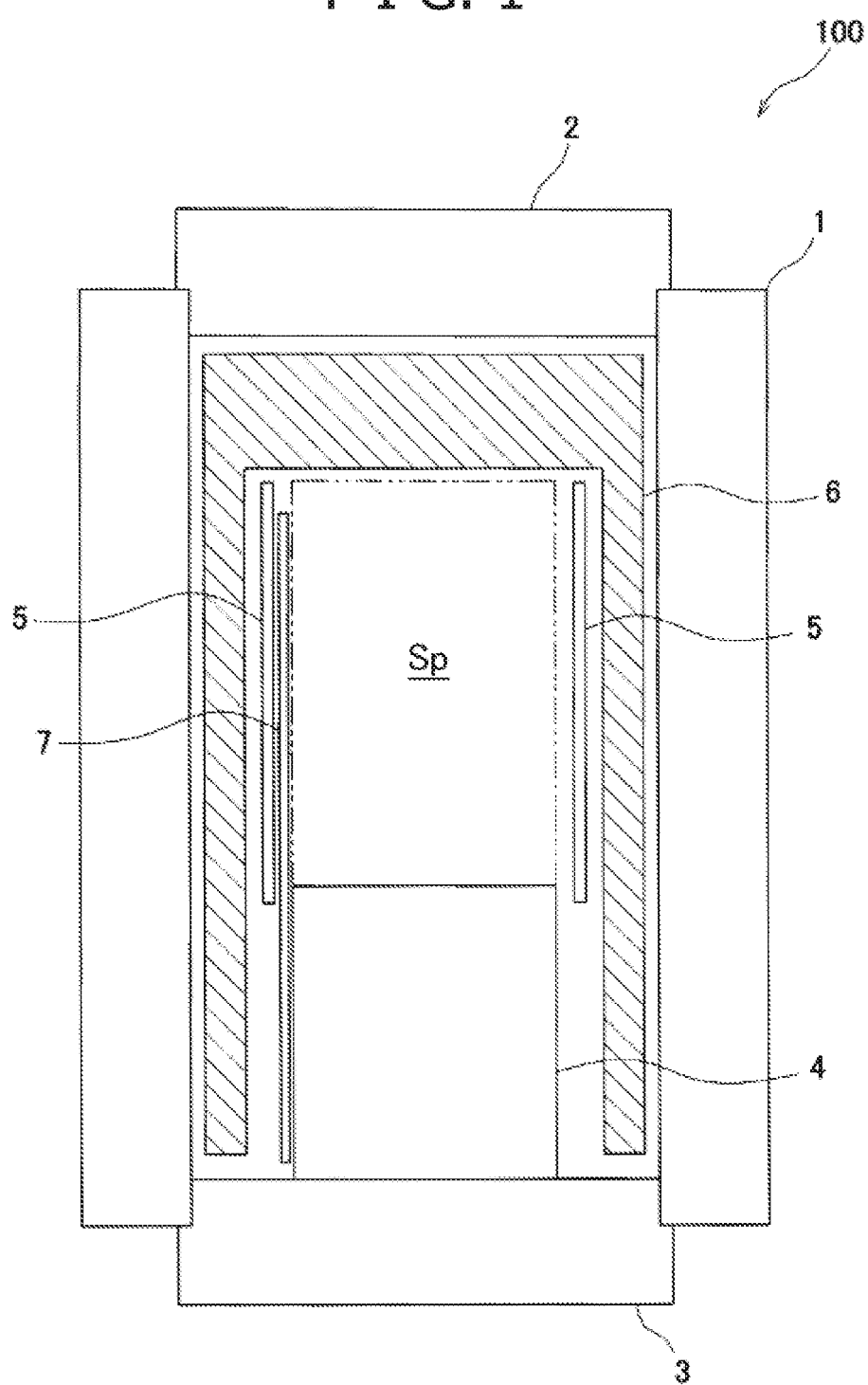
FIG. 1 is a cross-sectional front view of a HIP device in which a temperature measuring instrument according to an embodiment of the present invention is arranged therein.
Figure 2:
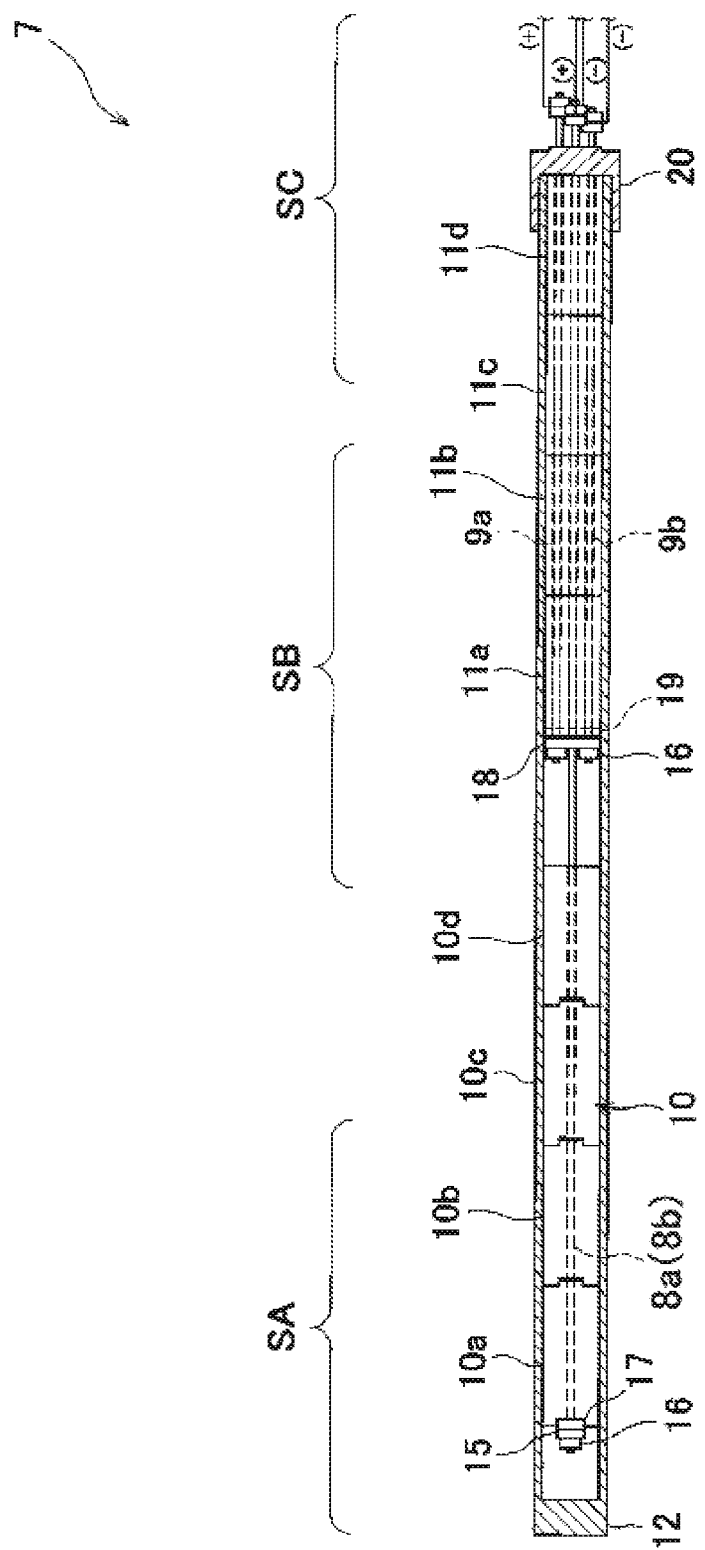
FIG. 2 is a cross-sectional front view of the temperature measuring instrument shown in FIG. 1.

The HIP device 100 shown in FIG. 1 includes a pressure container 1, an upper lid 2, a lower lid 3, a product table 4, a plurality of heaters 5, and a heat insulating layer 6. The pressure container 1 is formed into a cylindrical shape capable of accommodating a workpiece (not shown). The pressure container 1 has upper and lower openings, and the upper lid 2 and the lower lid 3 close the upper and lower openings respectively. The product table 4 is arranged in an interior of the pressure container 1, and the workpiece is placed on the product table 4. Above the product table 4, a treatment space Sp is formed. The plurality of heaters 5 are installed so as to surround the treatment space Sp. The heat insulating layer 6 is arranged outside the heaters 5 so as to surround the heaters 5, and has a shape in which an upper end portion of the heat insulating layer 6 is closed. The temperature measuring instrument 7 is arranged inside the heat insulating layer 6 in a posture in which an axial direction of the temperature measuring instrument 7 follows a vertical direction (an up and down direction).

The plurality of heaters 5 are, for example, arranged on a concentric circle in a plan view at predetermined intervals. Each of the plurality of heaters 5 according to the present embodiment has a strip shape. That is, in the present embodiment, the plurality of heaters 5 each of which has a strip shape and the temperature measuring instrument 7 are arranged on a concentric circle in a plan view. In FIG. 1, for convenience, the temperature measuring instrument 7 is shown inside the heaters 5. The temperature measuring instrument 7 may be actually arranged inside the heaters 5 as shown in FIG. 1.

Based on FIG. 2 to FIG. 12, the configuration of the temperature measuring instrument 7 will be described. The temperature measuring instrument 7 according to the present embodiment is a thermocouple thermometer, and includes a first pair of metal bodies 8a, 8b as thermocouple wires, a second pair of metal bodies 9a, 9b as thermocouple wires, a first insulating tube 10, a second insulating tube 11, a first connecting plate 15, a second connecting plate 18, a first spacer 17, and a second spacer 19. Each of the second pair of metal bodies 9a, 9b is shorter than each of the first pair of metal bodies 8a, 8b.

Each of the metal bodies 8a, 8b and the metal bodies 9a, 9b has a bar shape, and has an outer diameter of 3 mm, for example. The material of each of the metal bodies 8a, 9a is, for example, W-5% Re (tungsten-5% rhenium), and the material of each of the metal bodies 8b, 9b is, for example, W-26% Re (tungsten-26% rhenium).

Figure 7:
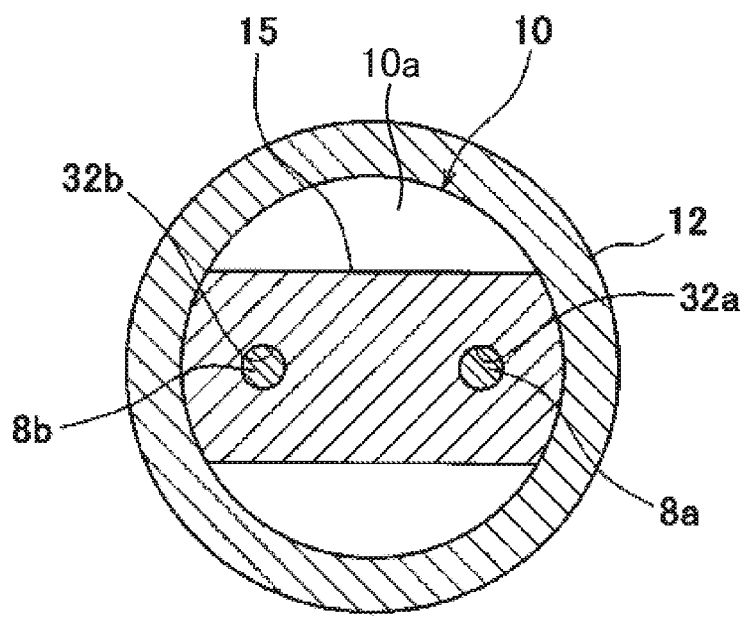
FIG. 7 is a front view showing a cross-section along VII-VII line of FIG. 3.
Figure 10:
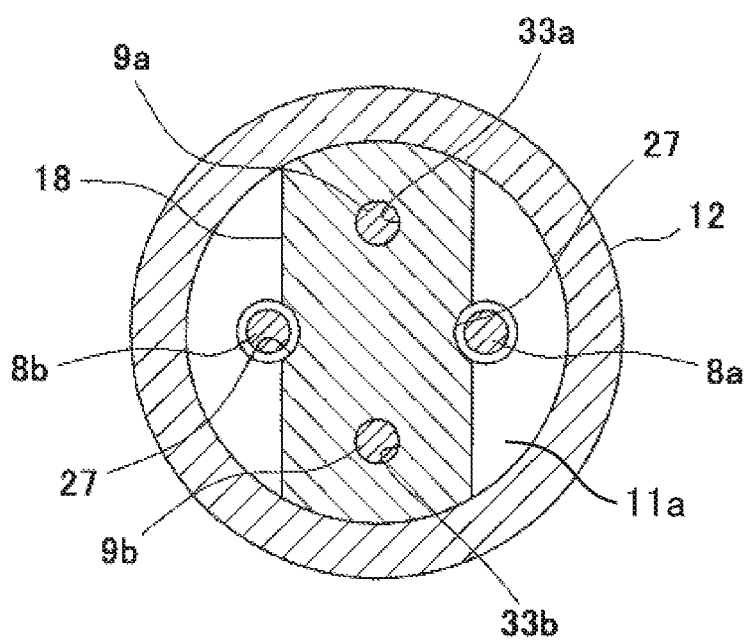
FIG. 10 is a front view showing a cross-section along X-X line of FIG. 4.

Each of the metal bodies 8a, 8b, 9a, 9b has both end portions in a longitudinal direction, that is, a distal end portion and a rear end portion on the opposite side thereof. The first connecting plate 15 connects the distal end portion of the metal body 8a and the distal end portion of the metal body 8b to each other. Similarly, the second connecting plate 18 connects the distal end portion of the metal body 9a and the distal end portion of the metal body 9b to each other. As shown in FIG. 7 and FIG. 10, the first and the second connecting plates 15, 18 are plate pieces having a longitudinal direction.

The material of each of the first and the second connecting plates 15, 18 is, for example, W-26% Re. The distal end portions of the metal bodies 8a, 8b connected to each other by the first connecting plate 15 are temperature measurement portions respectively. The distal end portions of the metal bodies 9a, 9b connected to each other by the second connecting plate 18 are also temperature measurement portions respectively. The temperature measuring instrument 7 is arranged within the HIP device such that the temperature measurement portions of the metal bodies 8a, 8b are located in an upper portion of the treatment space Sp shown in FIG. 1 and such that the temperature measurement portions of the metal bodies 9a, 9b are located in a lower portion of the treatment space Sp. That is, the temperature measuring instrument 7 is a WRe thermocouple thermometer capable of measuring respectively the temperatures of the upper portion and the lower portion of the treatment space Sp (inside of furnace), that is, the temperatures at two places, by the first pair of metal bodies 8a, 8b and the second pair of metal bodies 9a, 9b, respectively.

The first and the second insulating tubes 10 and 11 are aligned in a longitudinal direction of the temperature measuring instrument 7, and the first insulating tube 10 is located on a front side of the second insulating tube 11. The pair of metal bodies 8a and 8b are inserted through both the first and the second insulating tubes 10 and 11. The pair of metal bodies 9a and 9b which are shorter than the pair of metal bodies 8a and 8b are inserted through only the second insulating tube 11. A protecting tube 12 accommodates the first and the second insulating tubes 10, 11. A rear end portion of the temperature measuring instrument 7 is fitted into a protecting tube receiver 20 shown in FIG. 2 and FIG. 5. The material of the first and the second insulating tubes 10, 11 and the protecting tube 12 is, for example, BN (boron nitride). It is desirable that the first insulating tube 10 is fixed by a supporting member (not shown) in an axial direction thereof.

At the distal end portions of the metal bodies 8a, 8b, male screws are formed. As shown in FIG. 7, two screw holes 32a, 32b are formed in the first connecting plate 15, the distal end portion of the metal body 8a is screwed into the screw hole 32a so as to penetrate the first connecting plate 15, and the distal end portion of the metal body 8b is screwed into the screw hole 32b so as to penetrate the first connecting plate 15. To the respective distal end portions of the metal bodies 8a, 8b, the first connecting plate 15 is firmly fixed with nuts 16. The nuts 16 are respectively attached to the distal end portions. In this way, the distal end portion of the metal body 8a and the distal end portion of the metal body 8b are connected to each other via the first connecting plate 15.

Similarly, at the distal end portions of the metal bodies 9a, 9b, male screws are formed. As shown in FIG. 10, two screw holes 33a, 33b are formed in the second connecting plate 18, the distal end portion of the metal body 9a is screwed into the screw hole 33a so as to penetrate the second connecting plate 18, and the distal end portion of the metal body 9b is screwed into the screw hole 33b so as to penetrate the second connecting plate 18. To the respective distal end portions of the metal bodies 9a, 9b, the second connecting plate 18 is firmly fixed with the plurality of nuts 16 shown in FIG. 4. The plurality of nuts 16 are respectively attached to the distal end portions. In this way, the distal end portion of the metal body 9a and the distal end portion of the metal body 9b are connected to each other via the second connecting plate 18.

The material of the nuts 16 respectively used for fixing the first connecting plate 15 and the second connecting plate 18 is, for example, the same material as the material of the metal bodies to which the nuts 16 are attached.

Figure 9:
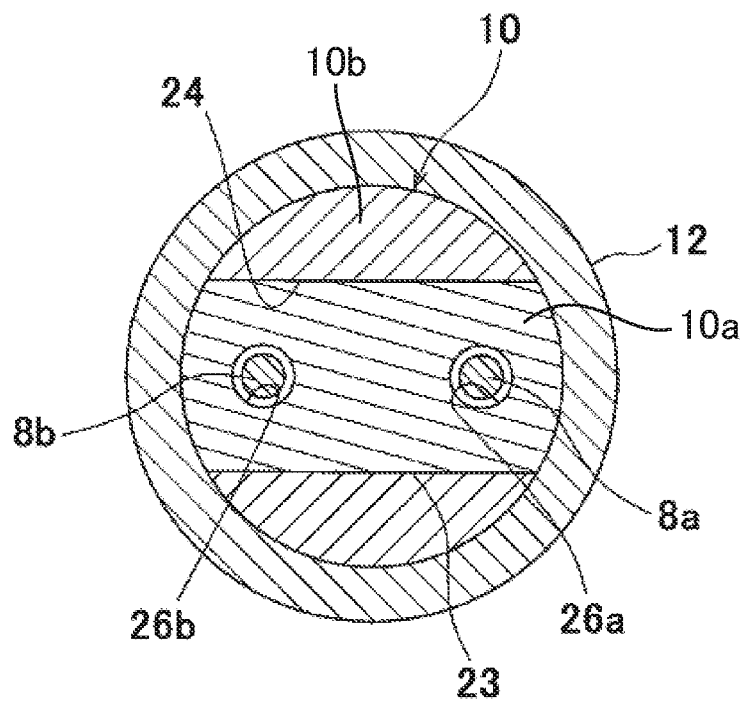
FIG. 9 is a front view showing a cross-section along IX-IX line of FIG. 3.

The first insulating tube 10 located in a front side portion (an upper portion in the present embodiment) of the temperature measuring instrument 7 between the first and the second insulating tubes 10, 11 is composed of a plurality of insulating tube pieces 10a, 10b, 10c, 10d mutually laminated in an axial direction. As shown in FIG. 9, two insertion holes 26a, 26b are formed in the respective insulating tube pieces 10a to 10d, the metal body 8a is inserted through the insertion hole 26a, and the metal body 8b is inserted through the insertion hole 26b. Each of the insertion holes 26a, 26b has an inner diameter larger than the outer diameter of the metal bodies 8a, 8b.

Figure 3:
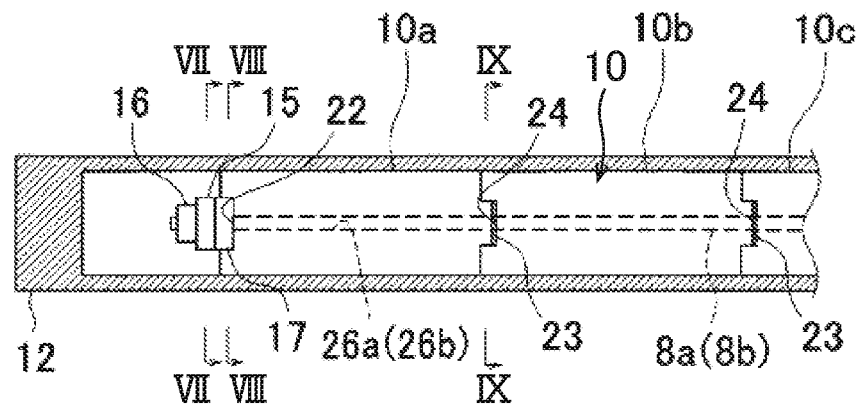
FIG. 3 is an enlarged view of an SA portion of FIG. 2.
Figure 4:
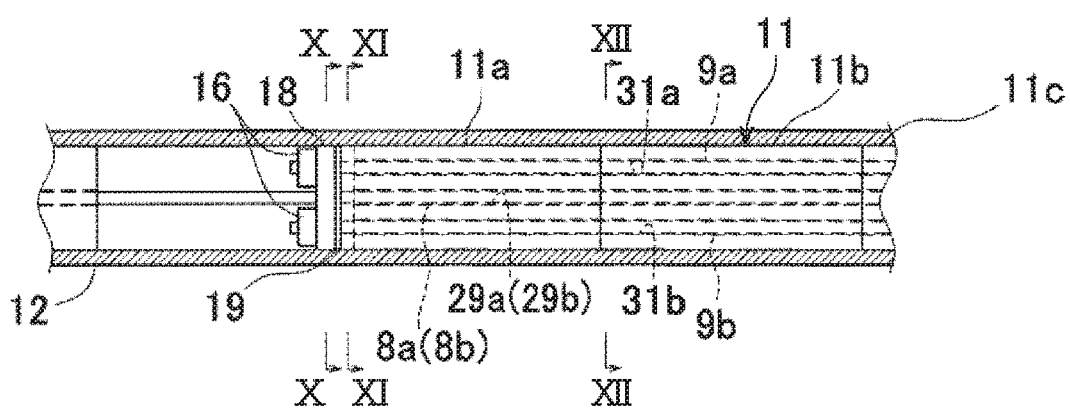
FIG. 4 is an enlarged view of an SB portion of FIG. 2.
Figure 5:
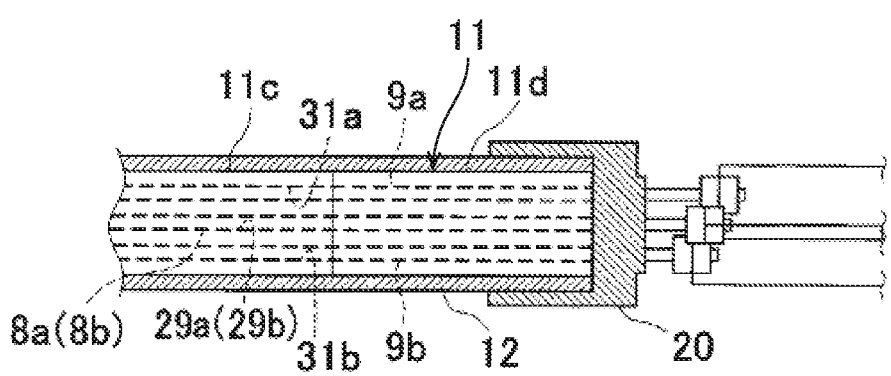
FIG. 5 is an enlarged view of an SC portion of FIG. 2.
Figure 6:
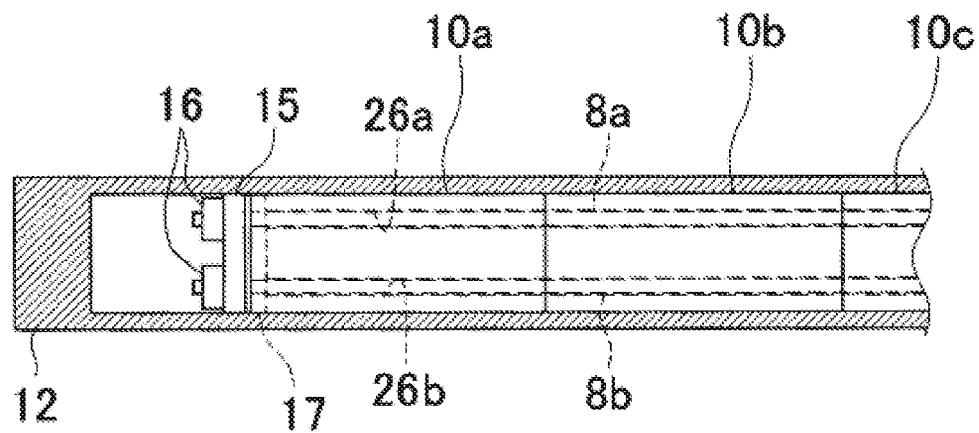
FIG. 6 is a cross-sectional view of the SA portion (the portion on a distal end side of the temperature measuring instrument) of FIG. 2 viewed along a direction different at 90 degrees with respect to the cross-section of FIG. 2.

As shown in FIG. 3 and the like, the insulating tube piece 10a nearest to the first connecting plate 15, that is, the insulating tube piece 10a located at the most distal end side among the insulating tube pieces 10a to 10d has both end portions in the axial direction, a concave portion 22 (a distal end engaging portion) partially recessed in the axial direction is formed at the end portion on the distal end side which is an end portion near the distal end portions of the pair of metal bodies 8a, 8b among the both end portions, and a convex portion 23 (a first engaging portion) partially protruding in the axial direction is formed at the rear end portion. The insulating tube pieces 10b, 10c located in the middle among the insulating tube pieces 10a to 10d also have a distal end portion and a rear end portion which are both end portions in the axial direction, a concave portion 24 (a second engaging portion) partially recessed in the axial direction is formed in the center of the distal end portion, and the convex portion 23 (the first engaging portion) partially protruding in the axial direction is formed in the center of the rear end portion. The insulating tube piece 10d located at the most rear end side among the insulating tube pieces 10a to 10d also has a distal end portion and a rear end portion which are both end portions in the axial direction, the concave portion 24 (the second engaging portion) partially recessed in the axial direction is formed at the distal end portion, and the rear end portion is flat.

Figure 8:
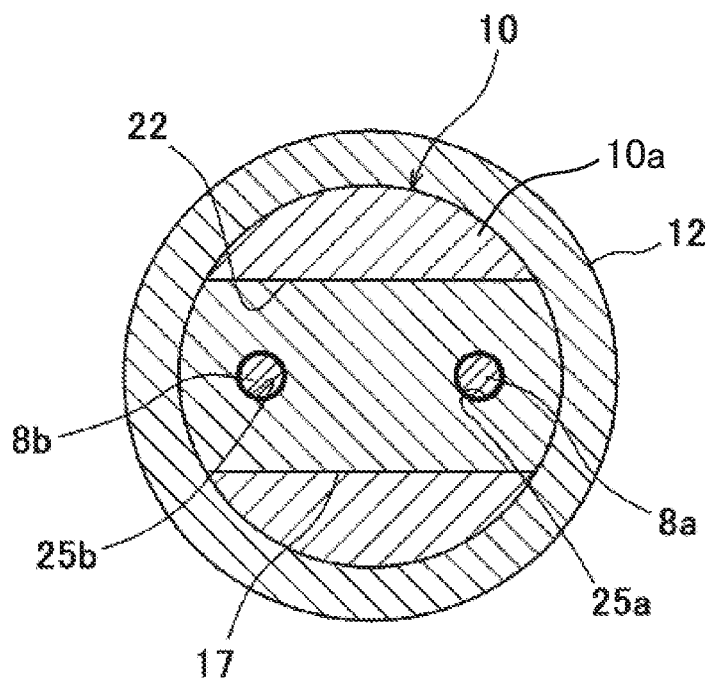
FIG. 8 is a front view showing a cross-section along VIII-VIII line of FIG. 3.

In the present embodiment, the first spacer 17 is interposed between the first connecting plate 15 and the insulating tube piece 10a. Also to the first spacer 17, the first connecting plate 15 and the insulating tube piece 10a are fastened in the axial direction with the nuts 16 while the metal bodies 8a, 8b are inserted therethrough. The first spacer 17 constitutes a first connecting member along with the first connecting plate 15. The first connecting member connects the pair of first metal bodies 8a, 8b to each other, and locks the first insulating tube 10 so as to restrict relative rotation, that is, relative displacement in a circumferential direction of the first insulating tube 10 with respect to the metal bodies 8a, 8b. The first spacer 17 is fitted in the concave portion 22 of the insulating tube piece 10a. That is, the first insulating tube 10 is locked to the first spacer 17 at the concave portion 22 so that relative displacement with respect to the first spacer 17 in its circumferential direction is restricted. As shown in FIG. 8, the first spacer 17 is a plate piece having a longitudinal direction orthogonal to the axial direction.

The concave portion 24 which is a first engaging portion formed at one of the both end portions in the axial direction of each of the insulating tube pieces 10b to 10d and the convex portion 23 which is a second engaging portion formed at an end portion axially adjacent to the concave portion 24 among the both end portions in the axial direction of each of the insulating tube pieces 10a to 10c are engaged with each other. Thereby, the insulating tube pieces axially adjacent to each other among the insulating tube pieces 10a to 10d are locked to each other at the concave portion 24 and the convex portion 23, and mutual relative displacement in the circumferential direction is restricted.

As shown in FIG. 8, in the first spacer 17, two insertion holes 25a, 25b are formed, and through the insertion holes 25a, 25b, the metal bodies 8a, 8b are inserted respectively. The insertion holes 25a, 25b have an inner diameter which is smaller than the inner diameter of the insertion holes 26a, 26b formed in the first insulating tube 10 and is approximately equal to the outer diameter of the metal bodies 8a, 8b. It is preferable that the first spacer 17 has the same material as the material of the first connecting plate 15. For example, it is preferable that if the material of the first connecting plate 15 is W-26% Re, the material of the first spacer 17 is also W-26% Re.

Figure 12:
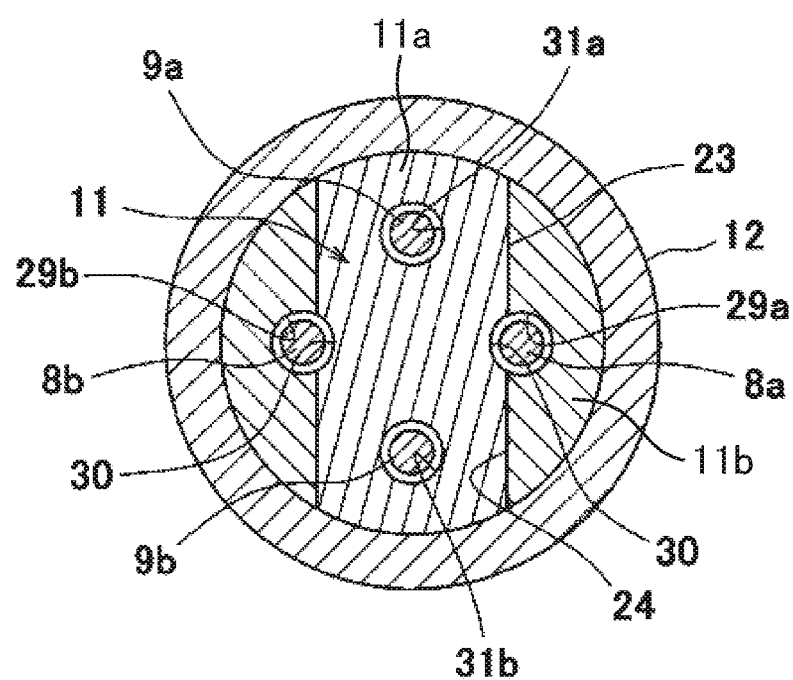
FIG. 12 is a front view showing a cross-section along XII-XII line of FIG. 4.

The second insulating tube 11 located in a rear side portion (a lower portion in the present embodiment) of the temperature measuring instrument 7 between the first and the second insulating tubes 10, 11 is composed of a plurality of insulating tube pieces 11a, 11b, 11c, 11d mutually laminated in the axial direction. As shown in FIG. 12, in the respective insulating tube pieces 11a to 11d, four insertion holes 29a, 29b, 31a, 31b through which the metal bodies 8a, 8b and the metal bodies 9a, 9b are respectively inserted are formed. The four insertion holes 29a, 31a, 29b, 31b are aligned in this order at intervals of 90 degrees in the circumferential direction. Each of the insertion holes 29a, 29b, 31a, 31b has an inner diameter larger than the outer diameter of the metal bodies 8a, 8b, 9a, 9b to be inserted therethrough.

Figure 11:
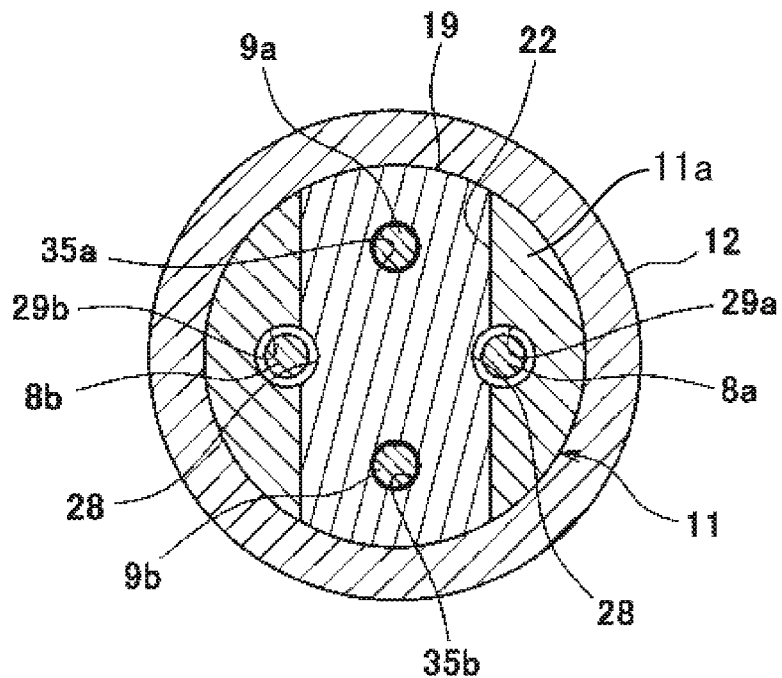
FIG. 11 is a front view showing a cross-section along XI-XI line of FIG. 4.

As shown in FIG. 11, the insulating tube piece 11a nearest to the second connecting plate 18, that is, the insulating tube piece 11a located at the most distal end side among the insulating tube pieces 11a to 11d has both end portions in the axial direction as with the insulating tube piece 10a, the concave portion 22 (the distal end engaging portion) partially recessed is formed at the end portion on the distal end side near the distal end portions of the second pair of metal bodies 9a, 9b among the both end portions, and the convex portion (the first engaging portion) (not shown) partially protruding is formed at the rear end portion. Similarly, the structures of the end portions in the axial direction of the insulating tube pieces 11b to 11d are the same as the structures of the aforementioned insulating tube pieces 10b to 10d.

In the present embodiment, the second spacer 19 is interposed between the second connecting plate 18 and the insulating tube piece 11a. Also to the second spacer 19, the second connecting plate 18 and the insulating tube piece 11a are fastened in the axial direction with the nuts 16 while the metal bodies 9a, 9b are inserted therethrough. The second spacer 19 constitutes a second connecting member along with the second connecting plate 18. The second connecting member connects the pair of second metal bodies 9a, 9b to each other, and locks the second insulating tube 11 so as to restrict relative rotation, that is, relative displacement in the circumferential direction of the second insulating tube 11 with respect to the metal bodies 9a, 9b. The second spacer 19 is fitted in the concave portion 22 of the insulating tube piece 11a. That is, the second insulating tube 11 is locked to the second spacer 19 at the concave portion 22 so that relative displacement with respect to the second spacer 19 in its circumferential direction is restricted. As shown in FIG. 11, the second spacer 19 is a plate piece having a longitudinal direction orthogonal to the axial direction.

As with the insulating tube pieces 10a to 10d, the insulating tube pieces axially adjacent to each other among the insulating tube pieces 11a to 11d are locked to each other at the concave portion and the convex portion (which are not shown), and mutual relative displacement in the circumferential direction is restricted.

As shown in FIG. 11, in the second spacer 19, two insertion holes 35a, 35b are formed, and through the insertion holes 35a, 35b, the metal bodies 9a, 9b are inserted respectively. The insertion holes 35a, 35b have an inner diameter which is smaller than the inner diameter of each of the insertion holes 29a, 29b, 31a, 31b formed in the second insulating tube 11 and is approximately equal to the outer diameter of the metal bodies 9a, 9b. It is preferable that the second spacer 19 has the same material as the material of the second connecting plate 18. For example, it is preferable that if the material of the second connecting plate 18 is W-26% Re, the material of the second spacer 19 is also W-26% Re.

In the second spacer 19 constituting the second connecting member, unlike the first spacer 17 on the distal end side, a pair of grooves 28 as shown in FIG. 11 are formed. The pair of grooves 28 are formed respectively in both side surfaces along the longitudinal direction of the second spacer 19, and are recessed in an arc shape so as to permit passage of the metal bodies 8a, 8b. As shown in FIG. 8, in both side surfaces along the longitudinal direction of the first spacer 17, the grooves 28 are not formed. The arc defining the groove 28 has, for example, the same radius as the radius of the insertion holes 26a, 26b formed in the first insulating tube 11. The grooves 28 are formed in the both side surfaces along the longitudinal direction of the first spacer 19, thereby enabling to secure a gap between the pair of first metal bodies 8a, 8b extending in the axial direction and the first spacer 19.

Similarly, also in both side surfaces along the longitudinal direction of the second connecting plate 18 constituting the second connecting member, a pair of grooves 27 permitting passage of the metal bodies 8a, 8b are formed respectively. The groove 27 is, for example, formed into an arc shape having the same radius as the radius of the insertion holes 29a, 29b, 31a, 31b formed in the second insulating tube 11. The pair of grooves 27 are formed in the both side surfaces along the longitudinal direction of the second connecting plate 18, thereby enabling to secure the gap between the metal bodies 8a, 8b extending in the axial direction and the second connecting plate 18.

Similarly, also in the insulating tube pieces 11a to 11c constituting the second insulating tube 11, a pair of grooves 30 as shown in FIG. 12 are formed. The pair of grooves 30 are, for example, formed respectively in a pair of side surfaces of the convex portion 23 of the insulating tube piece 11a, and formed into an arc shape constituting a part of the insertion holes 29a, 29b among the insertion holes 29a, 29b, 31a, 31b formed in the insulating tube piece 11a. The pair of grooves 30 are, for example, formed in a pair of side surfaces of the convex portion 23 of the insulating tube piece 11a, thereby enabling to secure the gap between the metal bodies 8a, 8b extending in the axial direction and the convex portion 23 of the insulating tube piece 11a.

In this way, in an interior of the insulating tube 11 on a base end side (the rear end side) of the temperature measuring instrument 7, the first pair of bar-shaped metal bodies 8a, 8b and the second pair of bar-shaped metal bodies 9a, 9b are arranged in parallel to each other.

According to the above described temperature measuring instrument 7, the engaging portions which are the convex portion 23 or the concave portion 24 are formed at the both end portions in the axial direction of each of the insulating tube pieces 10a to 10d and the insulating tube pieces 11a to 11d, and the insulating tube pieces adjacent to each other are locked to each other at the engaging portions, thereby relative rotation, that is, relative displacement in the circumferential direction between the insulating tube pieces 10a to 10d and the insulating tube pieces 11a to 11d is prevented.

Moreover, the (upper most in the present embodiment) insulating tube piece 10a located on the most distal end side among the insulating tube pieces 10a to 10d constituting the first insulating tube 10 on the distal end side (the upper portion side in the present embodiment) is locked to the first spacer 17 at the concave portion 22 formed at the end portion on the distal end side which is the end portion in the axial direction of the insulating tube piece 10a, and thereby relative rotation, that is, relative displacement in the circumferential direction of the insulating tube piece 10a with respect to the first spacer 17 is prevented. Moreover, the (upper most in the present embodiment) insulating tube piece 11a located on the most distal end side among the insulating tube pieces 11a to 11d constituting the second insulating tube 11 on the rear end side (the lower portion side in the present embodiment) is locked to the second spacer 19 at the concave portion 22 formed at the end portion in the axial direction of the insulating tube piece 11a, and thereby relative rotation, that is, relative displacement in the circumferential direction of the insulating tube piece 11a with respect to the second spacer 19 is prevented.

As a result of these, relative rotation of the first insulating tube 10 composed of the insulating tube pieces 10a to 10d and the second insulating tube 11 composed of the insulating tube pieces 11a to 11d with respect to the first and the second spacers 17, 19 is prevented. That is, relative positional relationship in the circumferential direction of the first and the second insulating tubes 10, 11 with respect to the bar-shaped metal bodies 8a, 8b, 9a, 9b constituting the thermocouple wires is fixed. This enables to suppress a chemical reaction between a material component of the metal bodies 8a, 8b, 9a, 9b and a material component of the first and the second insulating tubes 10, 11 by preventing contact between the bar-shaped metal bodies 8a, 8b, 9a, 9b constituting the thermocouple wires and the first and the second insulating tubes 10, 11.

In the temperature measuring instrument 7 according to the embodiment, the first pair of metal bodies 8a, 8b and the second pair of metal bodies 9a, 9b are arranged in parallel to each other in the interior of the second insulating tube 11, and therefore, as shown in FIG. 12, the four insertion holes 29a, 29b, 31a, 31b need to be provided in the interior of the second insulating tube 11 in order to permit insertion of the metal bodies 8a, 8b, 9a, 9b through the second insulating tube 11.

On the other hand, in the technique described in Patent Document 1 (JP S60-218583 A), in order to arrange the insertion holes of respective short tube bodies, which are laminated in multistage, on a concentric circle, positioning holes in the axial direction are bored in the respective short tube bodies, and a bar material is inserted in the positioning holes, and therefore, in the temperature measuring instrument like the temperature measuring instrument 7 in which the plurality of pairs of the metal bodies 8a, 8b, 9a, 9b are arranged in parallel to each other in the interior of the common insulating tube, a lot of insertion holes should be formed in the insulating tube pieces in order for insertion of the metal bodies. It is not easy to secure the space for such a lot of insertion holes in the interior of the insulating tube. The more the temperature measurement places, that is to say, the more the number of the metal bodies, the more serious the inconvenience is.

On the contrary, in the embodiment, the second and the first engaging portions each consisting of the convex portion 23 or the concave portion 24 are formed respectively at the end portions in the axial direction of the insulating tube pieces 10a to 10d (the insulating tube pieces 11a to 11d), and the insulating tube pieces are locked to each other at the second and the first engaging portions such that relative displacement in the circumferential direction of the insulating tube pieces adjacent to each other is restricted, and therefore, without forming the positioning holes as described in Patent Document 1 (JP S60-218583 A) in the interior of the insulating tube pieces, the insertion holes 26a, 26b of the insulating tube pieces 10a to 10d can be concentric to each other, and the insertion holes 29a, 29b, 31a, 31b of the insulating tube pieces 11a to 11d can be concentric to each other.

Moreover, the lack of the need for the aforementioned positioning holes in the insulating tubes facilitates securing the strength of the insulating tubes without increasing the diameter of the insulating tubes. In other words, enlargement of the inner diameter of the insertion holes formed in the insulating tubes is enabled.

In the temperature measuring instrument 7, the first and the second spacers 17, 19 respectively interposed between the first and the second connecting plates 15, 18 and the first and the second insulating tubes 10, 11 can suppress degradation of the first and the second connecting plates 15, 18 due to a chemical reaction by suppressing propagation of the chemical reaction from the first and the second insulating tubes 10, 11 to the first and the second connecting plates 15, 18 respectively. Although a chemical reaction may occur between the first and the second spacers 17, 19 and the first insulating tubes 10, 11, the first and the second spacers 17, 19 can be periodically replaced.

It is preferable that the first and the second spacers 17, 19 have the same material as the material of the first and the second connecting plates 15, 18. By this, in manufacturing the temperature measuring instrument 7, compared to the case where the material of the first and the second spacers 17, 19 and the material of the first and the second connecting plates 15, 18 are different, the kinds of required materials are reduced and procurement of materials is facilitated.

In the temperature measuring instrument 7, as shown in FIG. 10, the pair of grooves 27 formed in the both side surfaces along the longitudinal direction of the second connecting plate 18 enable passing the metal bodies 8a and 8b through the boundary of the second connecting plate 18 and the second insulating tube 11 when the temperature measuring instrument 7 is viewed from the axial direction. This enables to reduce the outer diameter of the temperature measuring instrument 7 while securing the strength of the second connecting plate 18. In a case where the metal bodies 8a, 8b are passed inside in a radial direction than the boundary portion of the second connecting plate 18 and the second insulating tube 11, two complete insertion holes must be formed in the second connecting plate 18, which leads to risk of decreasing the strength of the second connecting plate 18. Conversely, in order to pass the metal bodies 8a, 8b at a position outside in the radial direction than the boundary portion, the temperature measuring instrument 7 must have a large outer diameter.

The present invention is not limited to the embodiment described above. The present invention includes, for example, the following modifications.

One or both of the first and the second spacers 17, 19 according to the embodiment can be omitted. That is to say, the "connecting member" according to the present invention includes those composed of only the connecting plate without including the spacer. If the first spacer 17 (or the second spacer 19) is omitted, in the concave portion 22 provided at the end portion in the axial direction of the insulating tube piece 10a (the insulating tube piece 11a), the first connecting plate 15 (the second connecting plate 18) can be fitted. Thereby, the insulating tube piece 10a (the insulating tube piece 11a) and the first insulating tube 10 (the second insulating tube 11) including it are locked to the first connecting plate 15 (the second connecting plate 18) such that relative displacement in its circumferential direction with respect to the metal bodies 8a, 8b, 9a, 9b is restricted.

Conversely, the connecting member according to the present invention may include a plurality of spacers. For example, between the first connecting plate 15 (the second connecting plate 18) and the insulating tube piece 10a (the insulating tube piece 11a) according to the embodiment, a plurality of first spacers 17 (a plurality of second spacers 19) through which the metal bodies 8a, 8b are inserted may be arranged while being laminated in the circumferential direction.

At the end portion in the axial direction of the insulating tube piece 10a (the insulating tube piece 11a) according to the embodiment, instead of the concave portion 22, or in addition to the concave portion 22, a distal end engaging portion consisting of a convex portion may be provided. In this case, to the first spacer 17 (the second spacer 19), an engaging portion including a concave portion engageable with the distal end engaging portion including the convex portion is provided. If the first spacer 17 (the second spacer 19) is omitted, for example, to the first connecting plate 15 (the second connecting plate 18), an engaging portion consisting of a concave portion engageable with the distal end engaging portion consisting of the convex portion is provided.

A specific diameter of the metal bodies according to the present invention is not limited. For example, instead of the pair of bar-shaped metal bodies according to the embodiment, a pair of wire-shaped metal bodies having a small wire diameter such as 0.5 mm, for example, may be used as thermocouple wires.

A specific material of the metal bodies according to the present invention is also not limited. For example, in the embodiment, W-5% Re (tungsten-5% rhenium) and W-26% Re (tungsten-26% rhenium) are illustrated as the materials of the pairs of metal bodies having different materials from each other, but a pair of metal bodies having other materials may be used.

In the connecting member according to the present invention, the material of the spacer and the material of the connecting plate may be different from each other. For example, the material of the first spacer 17 (the second spacer 19) and the material of the first connecting plate 15 (the second connecting plate 18) may be different.

The insulating tube according to the present invention is not limited to those consisting of a plurality of insulating tube pieces, but may consist of a single member. For example, at least one of the first and the second insulating tubes 10, 11 according to the embodiment is not formed into a divided form consisting of the plurality of insulating tube pieces 10a to 10d (the plurality of insulating tube pieces 11a to 11d) laminated in the axial direction, and may consist of a single insulating tube material.

The temperature measuring instrument according to the present invention only has to include at least a pair of metal bodies. The temperature measuring instrument according to the present invention may be, for example, the one including only one of the first pair of metal bodies 8a, 8b and the second pair of metal bodies 9a, 9b and capable of measuring the temperature at a single place. Conversely, the temperature measuring instrument according to the present invention may be the one including three or more pairs of the metal bodies arranged in parallel to each other in the interior of the insulating tube and capable of measuring the temperature at three or more places.

The number of the insertion holes provided in the insulating tubes according to the present invention is also not limited. In the temperature measuring instrument 7 according to the embodiment, in the first insulating tube 11, the four insertion holes 29a, 29b, 31a, 31b for inserting all of the metal bodies 8a, 8b, 9a, 9b therethrough are formed, and in the second insulating tube 10, only the two insertion holes 26a, 26b for inserting the metal bodies 8a, 8b therethrough are formed, but as with the second insulating tube 11, in the first insulating tube 10, four insertion holes for inserting all of the metal bodies 8a, 8b, 9a, 9b therethrough may be formed. This enables unification of the structures of the first and the second insulating tubes 10, 11, that is, the structures of the insulating tube pieces 10a to 10d and the insulating tube pieces 11a to 11d. This also applied to the first and the second connecting plates 15, 18, and the first and the second spacers 17, 19.

The temperature measuring instrument according to the present invention only has to include at least one insulating tube. The temperature measuring instrument according to the present invention may include, as an insulating tube thereof, only a single insulating tube, for example, the second insulating tube 11 according to the embodiment, or may include three or more insulating tubes arrayed in the axial direction.

As above, the embodiment of the present invention and the modifications thereof have been described. It should be noted that, in addition, various alterations can be made within the scope of envisagement of one skilled in the art.

As described above, a temperature measuring instrument for a high temperature and pressure furnace having a structure capable of preventing relative displacement in a circumferential direction of an insulating tube with respect to at least a pair of metal bodies is provided. The temperature measuring instrument includes at least one pair of metal bodies each of which is wire-shaped or bar-shaped and has a different material from each other, an insulating tube having a plurality of insertion holes having an inner diameter larger than an outer diameter of each of the at least one pair of metal bodies and permitting insertion of the metal bodies, and at least one connecting member fixed to respective distal end portions each of which is one end portion of both end portions in a longitudinal direction of the at least one pair of metal bodies to connect the distal end portions to one another. At the end portion on a distal end side near the distal end portion of both end portions in an axial direction of the insulating tube, a distal end engaging portion including at least one of a concave portion and a convex portion is provided, the distal end engaging portion is engaged with the connecting member, and thereby, the insulating tube is locked to the connecting member at the distal end engaging portion so as to restrict relative displacement in a circumferential direction of the insulating tube with respect to the metal bodies to which the connecting member is fixed.

In the temperature measuring instrument, the insulating tube is locked to the connecting member, which connects the pair of metal bodies to each other, at the distal end engaging portion thereof, and thereby, relative displacement in the circumferential direction of the insulating tube with respect to the pair of metal bodies is restricted, and contact between the pair of metal bodies and the insulating tube is prevented.

The connecting member may include a connecting plate fixed to the respective distal end portions of the pair of metal bodies, and a spacer which is interposed between the connecting plate and the insulating tube and through which the pair of metal bodies are inserted. In this case, it is desirable that the insulating tube is locked to the spacer at the distal end engaging portion.

Further, it is more preferable that the spacer has the same material as the material of the connecting plate.

The insulating tube may be composed of a plurality of insulating tube pieces mutually laminated in an axial direction. In this case, it is preferable that, at the end portions in the axial direction of the insulating tube pieces axially adjacent to each other among the plurality of insulating tube pieces, a first engaging portion including at least one of a concave portion recessed in the axial direction and a convex portion protruding in the axial direction, and a second engaging portion engageable with the first engaging portion are respectively provided, and the insulating tube pieces adjacent to each other are locked to each other at the first and the second engaging portions so as to restrict relative displacement in the circumferential direction of the insulating tube pieces adjacent to each other.

The at least one pair of metal bodies includes a first pair of metal bodies and a second pair of metal bodies, and the first pair of metal bodies and the second pair of metal bodies may be arranged in parallel to each other in an interior of the insulating tube.

In this case, it is preferable that the at least one connecting member includes a first connecting member connecting distal end portions of the first pair of metal bodies to each other and a second connecting member connecting distal end portions of the second pair of metal bodies to each other, the second pair of metal bodies are shorter than the first pair of metal bodies, the second connecting member has both side surfaces along a longitudinal direction orthogonal to the axial direction, and grooves permitting passage in the axial direction of the first pair of metal bodies are formed in the both side surfaces.

The invention claimed is:

1. A temperature measuring instrument for a high temperature and pressure furnace, comprising:

at least one pair of metal bodies each of which is wire-shaped or bar-shaped, where the metal bodies each have two end portions and two side surfaces and have a different material from each other;

an insulating tube having a plurality of insertion holes having an inner diameter larger than an outer diameter of each of the at least one pair of metal bodies and permitting insertion of the metal bodies; and at least one connecting member fixed to respective distal end portions each of which is one end portion of both end portions in a longitudinal direction of the at least one pair of metal bodies to connect the distal end portions to one another, wherein:

at an end portion on a distal end side near the distal end portion of both end portions in an axial direction of the insulating tube, a distal end engaging portion including at least one of a concave portion and a convex portion is provided, the distal end engaging portion is engaged with the connecting member, and thereby, the insulating tube is locked to the connecting member at the distal end engaging portion so as to restrict relative displacement in a circumferential direction of the insulating tube with respect to the metal bodies to which the connecting member is fixed.

2. The temperature measuring instrument according to claim 1, wherein:

the insulating tube is composed of a plurality of insulating tube pieces mutually laminated in an axial direction;

at the end portions in the axial direction of the insulating tube pieces axially adjacent to each other among the plurality of insulating tube pieces, a first engaging portion including at least one of a concave portion recessed in the axial direction and a convex portion protruding in the axial direction, and a second engaging portion engageable with the first engaging portion are respectively provided; and the insulating tube pieces adjacent to each other are locked to each other at the first and the second engaging portions so as to restrict relative displacement in the circumferential direction of the insulating tube pieces adjacent to each other.

3. The temperature measuring instrument according to claim 1, wherein:

the connecting member includes a connecting plate fixed to the respective distal end portions of the pair of metal bodies, and a spacer which is interposed between the connecting plate and the insulating tube and through which the pair of metal bodies are inserted; and the insulating tube is locked to the spacer at the distal end engaging portion.

4. The temperature measuring instrument according to claim 3, wherein the spacer has the same material as the material of the connecting plate.

5. The temperature measuring instrument according to claim 1, wherein:

the at least one pair of metal bodies includes a first pair of metal bodies and a second pair of metal bodies; and the first pair of metal bodies and the second pair of metal bodies are arranged in parallel to each other in an interior of the insulating tube.

6. The temperature measuring instrument according to claim 5, wherein:

the at least one connecting member includes a first connecting member connecting distal end portions of the first pair of metal bodies to each other and a second connecting member connecting distal end portions of the second pair of metal bodies to each other;

the second pair of metal bodies are shorter than the first pair of metal bodies;

the second connecting member has both side surfaces along a longitudinal direction orthogonal to the axial direction, and grooves permitting passage in the axial direction of the first pair of metal bodies are formed in the both side surfaces.

* * * * *